APPARATUS FOR EQUALIZING A TRANSMISSION SYSTEM

Filed May 7, 1965 3 Sheets-Sheet 1

INVENTOR
R. S. GRAHAM
BY Charles D. Call
ATTORNEY

United States Patent Office 3,368,167

Patented Feb. 6, 1968

3,368,167

APPARATUS FOR EQUALIZING A TRANSMISSION SYSTEM

Robert S. Graham, Boxford, Mass., assignor to Bell Telephone Laboratories, Incorporated, New York, N.Y., a corporation of New York Filed May 7, 1965, Ser. No. 454,097
9 Claims. (Cl. 333—18)

This invention relates to signal transmission systems and, more particularly, to equalizers for improving the loss-frequency characteristics of such systems.

An unequalized transmission system, whether it is made up of a simple pair of wires or a coaxial cable, seldom exhibits transfer characteristics which are appropriate for sending television, multiplexed telephone or data signals over long distances. Normally, such signals require a medium which exhibits a substantially flat loss-frequency characteristic. When the facility is installed, therefore, manually adjustable equalizers are commonly used to compensate for those imperfections which are essentially constant. Automatically adjustable equalizers, normally called "regulators," are then used to correct performance deviations which vary with time.

Changes in temperature and the aging of components are among the principal causes of the more rapid transmission deviations. Both causes may be taken into account by "pilot-controlled regulators" whose gain-frequency characteristics vary in response to changes in the relative amplitude of several pilot signals having different frequencies which are transmitted over the system. Unfortunately, even slight system nonlinearities operate on these pilot signals to cause undesirable modulation products to be introduced as interference throughout the band. Moreover, the multiple pilot regulating system may not be used with ease in conjunction with facilities carrying wideband data or television signals. To provide the needed correction in such cases, the pilot signals must be placed within the information carrying frequency band and, accordingly, may cause interference to normal communications.

It is accordingly a principal object of the present invention to accurately equalize a transmission facility without the use of a plurality of continuous pilot signals.

One prior scheme for providing reasonably good equalization without the use of several pilot signals is based upon the realization that changes in channel characteristics due to temperature variations can be, to a large extent, predicted. After these "cause-associated" deviations have been predetermined on the basis of computations and laboratory measurements, fairly good results may be obtained from an equalizer which is responsive only to a single temperature-measuring pilot signal or to a thermistor buried with the cable. Such temperature controlled regulators are capable of compensating only for transmission deviations of a relatively simple and predictable nature and are accordingly inadequate when highly accurate equalization is required.

It is accordingly a further object of the invention to adjust an equalizer to provide compensation for relatively complex and unpredictable changes in the transfer characteristics of a transmission facility.

While some equalization may be accomplished at the terminals of a communication link by operating personnel who manually adjust equalizers to their optimum settings, it is preferable to equalize against such deviations at intervals along the transmission line in order to prevent overloading of repeating amplifiers and to reduce noise. These remote, unattended equalizers are often located at points which are accessible only with such difficulty that even occasional manual adjustment is most inconvenient.

It is accordingly a still further object of the invention to adjust unattended equalizers in a transmission system from a single main station.

In a principal aspect, the present invention takes the form of a scheme for optimizing the transmission characteristics of a channel by adjusting unattended equalizers on the basis of measurements made at the main station. According to a principal feature of the invention, command signals transmitted from the attended main station to the remote location are employed to change the state of digital memory circuits which, in turn, change the setting of variable impedance elements which determine the gain-frequency characteristic of the equalizer. According to a further feature of the invention, normally inactive test signal oscillators situated at the remote location are activated upon command from the main station to permit testing of that portion of the transmission path which includes the equalizer being adjusted. In a preferred arrangement, the memory employed is a set of individual memory units, such as binary counters, or the like. Each unit holds a "count" which may be increased or decreased upon command from the main station. Digital-to-analog conversion means are then employed to translate the numerical count from each memory unit into an analog signal which controls the impedance of a variable element such as a thermistor. Accordingly, corrective adjustments may be made, when required, merely by transmitting commands to change the state of the memory units. The command signals may conveniently be positioned at a frequency outside the range of normally used frequencies to eliminate interference with regular communication service during the adjustment operation.

These and other objects, features and advantages of the invention may be more fully understood by considering the following detailed description of a specific embodiment of the invention. Throughout the text of this description, reference will be made to the attached drawings in which.

Figure 1:
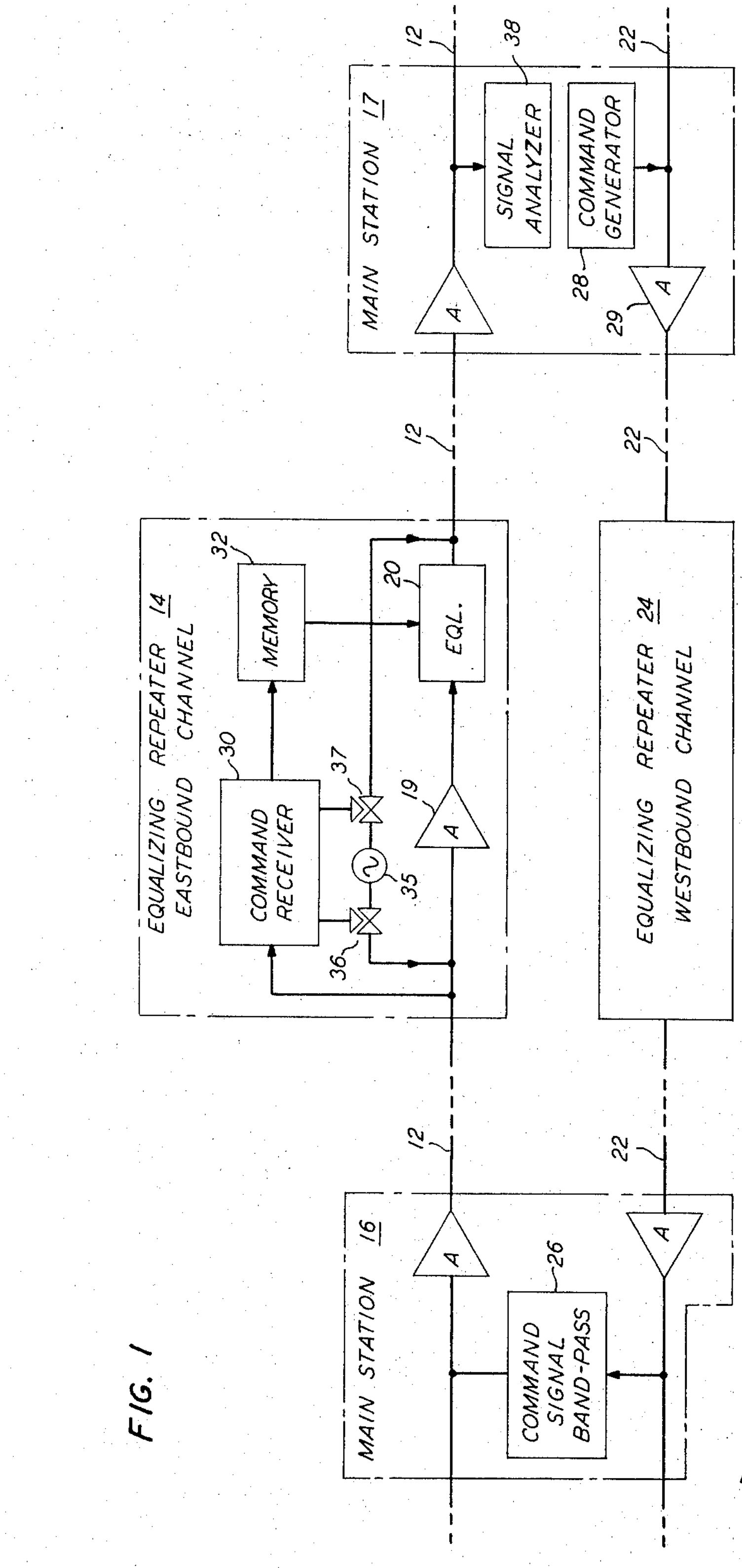
FIG. 1 illustrates the equalizing scheme according to the invention in block diagram form.

The embodiment of the invention shown in block form in FIG. 1 is adapted to improve the performance of the eastbound channel 12 of a two-way facility. An equalizing repeater station 14 is situated in the eastbound channel 12 between main stations 16 and 17. A repeating amplifier 19 and an equalizer 20 are serially connected with the channel 12 at the equalizing repeater station 14. A westbound channel 22, which includes an equalizing repeater 24, is also connected between main stations 16 and 17.

In order to adjust the frequency response of the equalizer 20 to improve the characteristics of the channel 12, command signals are sent from main station 17, down the westbound channel 22 to main station 16, through a bandpass filter 26 to the eastbound channel, and back to the repeating equalizer station 14. These command signals are produced by the command generator 28 and applied to the input of an amplifier 29 which is connected in channel 22. Upon reaching repeater station 14, signals are converted into appropriate form by a command receiver 30 and applied to reset a memory unit 32. The state of memory unit 32, in turn, controls the setting of the equalizer 20. Thus, by generating command signals at the main station 17, the equalizer 20 at the remote station 14 may be adjusted to improve the transmission characteristics of the channel 12.

Other command signals produced by the generator 28 are employed to apply a test signal to the channel 12 at the remote location in order to ascertain what corrective adjustments should be made to the equalizer 20. The oscillator 35 forms the test signal source. In response to the appropriate command signals, this test signal may be selectively applied either to the input of amplifier 19 by closing a switching element 36 or to the output of equalizer 20 by closing a switching element 37. When the test signal is applied to the output of equalizer 20, a signal analyzer 38 (which is connected to channel 12 at main station 17) provides a measurement of the loss characteristic of that portion of channel 12 which links repeater station 14 and main station 17. When the switching element 36 is closed, a measurement of joint characteristic of the above-mentioned portion and the amplifier-equalizer combination is obtained. The transfer gain of the amplifier-equalizer combination alone is equivalent to the difference between these two measured loss characteristics.

Using the same scheme described for a single channel in conjunction with the illustrative embodiment shown in FIG. 1, both incoming channels to any given main station may be adjusted from that main station. Each incoming channel may well include several equalizing repeaters. Thus, all of the equalizers in that portion of the westbound channel 22 to the right of main station 17 would also be adjusted from main station 17 while the repeaters in channel 22 between stations 16 and 17 would be adjusted from main station 16. In order to simplify the arrangement shown in FIG. 1, however, only the main station equipment required for adjusting the equalizers situated within channel 12 between stations 16 and 17 has been shown.

Figure 2:
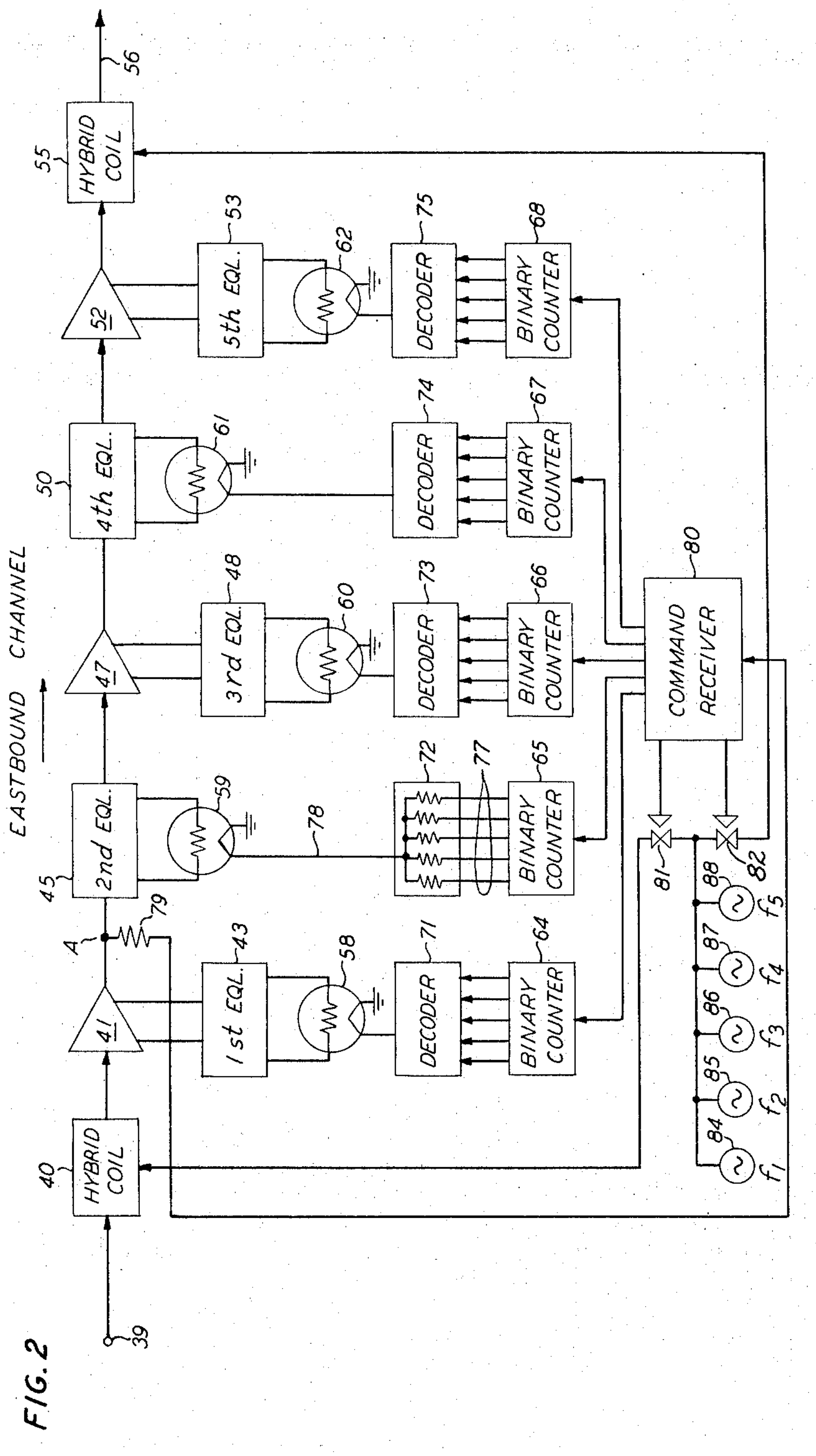
FIG. 2 shows the equipment at the remote equalizer location in more detail.

FIG. 2 of the drawings illustrates in more detail an equalizing repeater which embodies the principles of the invention. The equalizing repeater shown in FIG. 2 includes five separate equalizing units, each of which may be adjusted to provide a gain correction over a relatively narrow range of frequencies.

Incoming signals to the equalizing repeater are first applied to the terminal 39 which is connected through a hybrid transformer 40 to the input of an amplifier section 41. A first equalizer 43 is interconnected with amplifier section 41. Signals appearing at the output of amplifier section 41 are passed through a second equalizer 45 to the input of a further amplifier section 47. A third equalizer 48 is connected to amplifier 47, and a fourth equalizer 50 is connected between the output of amplifier section 47 and the input of an amplifier section 52. A fifth equalizer section 53 is connected to the amplifier section 52. Output signals from the amplifier section 52 are passed through a hybrid transformer 55 to the outgoing channel 56.

Figures 3, 4:
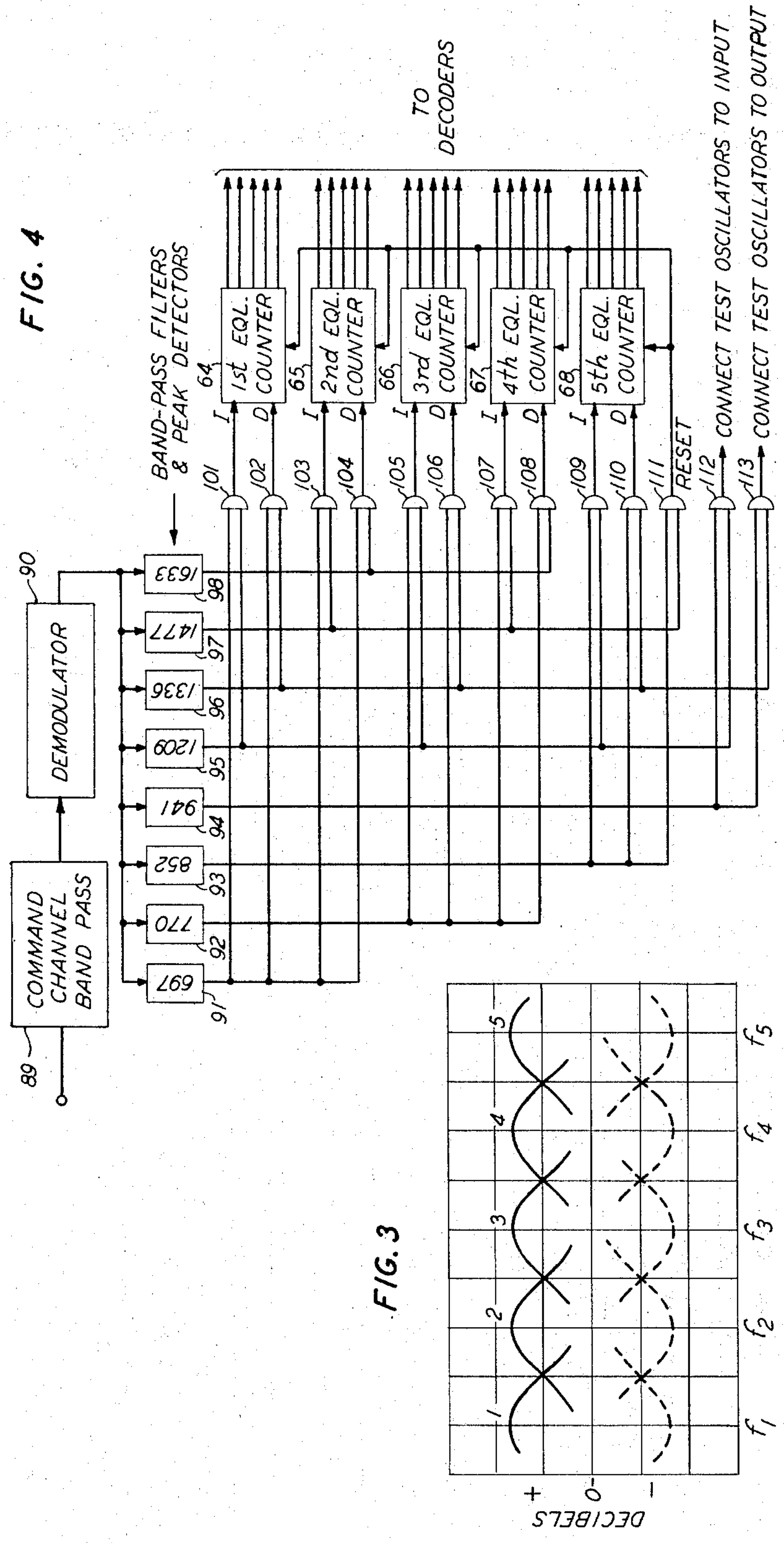
FIG. 3 is a graph which illustrates the manner in which the gain-frequency characteristics of the equalizing repeater of FIG. 2 may be adjusted.
FIG. 4 is a schematic drawing of a command receiver and memory combination which may be used to instrument the invention.

Each of the equalizers is provided with a variable resistance element for controlling the transfer gain over a narrow portion of the overall frequency band. For this purpose, thermistors 58, 59, 60, 61, and 62 are interconnected with equalizers 43, 45, 48, 50 and 53, respectively. FIG. 3 of the drawings illustrates the range of adjustments which are possible. By controlling the resistance of thermistor 58, for example, the first equalizer 43 can be adjusted between the limits shown by the solid and dashed "bumps" which are centered on frequency $f_1$. In a similar manner, the second equalizer 45 through the fifth equalizer 53 may be adjusted between the overlapping bumps centered on frequencies $f_2$ through $f_5$, respectively. By varying the relative resistance values of the several thermistors, the gain-frequency characteristic of the equalizing repeater shown in FIG. 2 may be adjusted to provide corrective coverage of the entire band of interest. A larger number of equalizing sections may be used, if required, to provide correction for more complex deviations.

The resistance value of each of the five thermistors 58 through 62 is controlled by one of a set of five reversible binary counter memory units 64 through 68, respectively. Five decoders 71 through 75 are, in turn, each connected to one of the memory units 64 through 68, respectively. Each decoder converts the digital "count" stored in the connected memory unit into an analog current having a magnitude which determines the resistance of one of the thermistors. For example, the count held in binary counter 65 appears in parallel digital form on conductors 77. The decoder 72 comprises a set of binarially-weighted resistances, each of which connects one of the conductors 77 to the conductor 78. The heater of thermistor 59 is connected between conductor 78 and ground. Thus, depending upon which of the five conductors 77 are energized, a selected one of 32 (or $2^5$) discrete current levels may be passed through the heater of thermistor 59 to determine the thermistor resistance. The remaining thermistors are controlled in like fashion.

In the arrangement shown in FIG. 2, the count held by each of the binary counter memory units 64 through 68 may be either increased or decreased upon command from the main station. Command signals traveling down the eastbound channel are passed from point A through a resistance 79 to the input of command receiver 80. Receiver 80 converts these command signals into a form suitable for increasing or decreasing the count in the selected memory unit. Control signals from the command receiver 80 may also be employed to selectively actuate two switching elements 81 and 82. The switching element 81 when closed applies a test tone from each of five oscillators 84 through 88 to an input of hybrid transformer 40. Likewise, when the switching element 82 is closed, these five test tones are applied to an input of the hybrid coil 55. The two hybrid transformers 40 and 55 allow the test tones to be injected into the outgoing channel while minimizing coupling between the two inputs to the hybrid.

It will be noted that the five oscillator frequencies $f_1$ through $f_5$ correspond to those frequencies upon which the five equalizer "bumps" are centered as shown in FIG. 3. Using the testing procedure outlined in conjunction with FIG. 1, the direction and size of the needed corrective adjustment may be determined for each of the five equalizers. These adjustments may then be accomplished by transmitting command signals to reset the memory units 64 through 68 to new values.

A command signal receiver which may be used to deliver the appropriate control signals to the various memory units and switching elements is shown in FIG. 4 of the drawings. A total of thirteen different commands are required to operate the arrangement shown in FIG. 2. Ten of these are employed to either increase or decrease the count in the five memory units. The eleventh is used to reset all of the memory units to a mid-range count and the twelfth and thirteenth are employed to connect the test oscillators as desired. Each command, as transmitted from the main station is encoded as two audio frequency tones. To provide protection against false operation caused by spurious signals, both must be received to cause a command to be executed.

At the main station, the two-tone audio command signal is employed to modulate a carrier. Although this carrier may be suppressed before transmission, in this application it has been found to be more economical to transmit the carrier, thereby avoiding the need for a precise local oscillator to demodulate the signal. The command signal is transmitted in a command frequency channel which is distinct from the frequencies carrying the conventional services. Where several equalizers are connected in the same line, the carrier frequency used is different for each equalizer. At the equalizing repeater station, the received command signal is first isolated from the other frequencies by the command channel bandpass filter 89 as shown in FIG. 4. Filter 89 passes those command signals having the proper carrier frequency to a demodulator 90 which converts the high frequency command signal into the original modulating audio tones. These audio tones are passed to the input of a plurality of tone bandpass filters and peak detectors which produce D.C. voltages whenever the corresponding audio tones are present. Each of thirteen AND gates 101 to 113 is connected to a unique pair of the filters 91 through 98 to detect a particular command. By way of example, the AND gate 101 (which detects the command to increase the count by one unit in the first equalizer counter 64) has its inputs connected to the filter 91 and the filter 95 which pass signals at 697 and 1209 cycles, respectively. The output of gate 101 is connected to the INCREASE input to counter 64. Only when the 697 and 1209 cycle tones appear at the output of demodulator 90 is the count increased in counter 64. Similarly, the AND gate 111, which is connected to filters 93 and 97, is energized to reset all of the counters to a mid-range value when and only when tones having the frequencies 852 and 1477 cycles are present at the output of demodulator 90. The AND gates 112 and 113 have their outputs connected to the switching elements 81 and 82 (shown in FIG. 2), respectively, to insert the test oscillator signals either ahead of or after the equalizing repeater.

The embodiment of the invention which has been described is merely illustrative of one application of the principles of the invention. Numerous modifications may be made to the described embodiment by those skilled in the art without departing from the true spirit and scope of the invention.

What is claimed is:

1. In combination, a transmission channel including a main station and a remote station, an equalizer connected with said channel at said remote location, a digital memory circuit at said remote location, a digital to analog converter at said remote location, means at said remote station to connect said digital memory circuit to said digital to analog converter, means at said main station for generating a command signal and for applying said command signal to said channel, receiving means at said remote location for changing the state of said digital memory circuit in response to said command signal, means for varying the output of said digital to analog converter as said digital memory circuit changes state, a control element interconnected with said equalizer for adjusting the frequency response of said equalizer, and means for periodically varying the impedance of said control element in response to changes in the output of said digital to analog converter.

2. In combination, first and second main stations connected by an electrical transmission line, a third station on said line at a point remote from both said first and second stations, an equalizing network connected with said line at said third station, said network having an input and an output and including at least one variable impedance element for adjusting the signal transfer characteristics between said input and said output, a digital memory circuit at said third station for storing a count, means at said first station for generating a first command signal, means for communicating said first command signal to said third station, means at said third station responsive to said command signal for resetting said digital memory circuit to a new count, and digital-to-analog conversion means connected to said digital memory circuit, means for varying said digital to analog converter as said digital memory circuit is reset to said new count, said digital to analog converter being responsive to said new count for periodically altering the impedance of said variable impedance element.

3. The combination as set forth in claim 2 including a test signal generator located at said third station, means at said first station for selectively generating second and third command signals, means for communicating said second and third command signals to said third station, means responsive to said second command signal for connecting said test signal generator to the input of said equalizing network, means responsive to said third command signal for connecting said test signal generator to the output of said equalizing network, and means connected to said line at one of said main stations for measuring the magnitude of said test signal as received at said one main station.

4. In combination, a transmission line which includes a main station and a remote station, an equalizing network connected with said line at said remote station, said network including a variable impedance element for controlling the transfer gain of said network at a particular frequency, means located at said main station for generating any selected one of a plurality of different command signals, means for communicating said selected command signal to said remote location, a binary counter located at said remote location, a digital to analog converter connected to said binary counter means for changing the count held by said counter in response to the receipt of a first one of said command signals, means to change the output of said digital to analog converter in response to changes in the count held by said counter, means for periodically altering the impedance of said variable impedance element in response to a change in said digital to analog converter which is responsive to the count held by said counter, a source of a test signal having said predetermined frequency, and means located at said remote station for connecting said source to said line in response to the receipt of a second one of said command signals.

5. In combination, a transmission line which includes a main station and a remote station, an equalizing network connected with said line at said remote station, said network including a plurality of variable impedance elements each of which respectively controls the transfer gain of said network at a particular one of a plurality of different frequencies, means located at said main station for generating any selected one of a plurality of different command signals, means for communicating said selected command signal to said remote location, a plurality of binary counters located at said remote location, a plurality of digital to analog converters with one of said converters connected to a respective one of said plurality of binary counters, means for changing the count held by a predetermined one of said counters in response to the receipt of said selected command signal, means for changing the output of a predetermined one of said digital to analog converters in response to the change in count held by said predetermined one of said counters and means for periodically altering the impedance of a predetermined one of said variable impedance elements in response to a change in said predetermined digital to analog converter which is responsive to a change in the count held by said predetermined one of said counters.

6. In combination with a transmission line which is terminated by an attendant main station, apparatus for equalizing said line at an unattended point on said line remote from said main station which comprises, in combination, an equalizing network connected with said line at said unattended point, said network including $n$ variable impedance elements each of which controls the transfer gain of said network at a particular one of $n$ different frequencies, where $n$ is an integer greater than unity means at said attended main station for generating a selected one of at least $n$ different command signals, means for communicating said selected command signal to said unattended point, $n$ digital memory units at said unattended point each for storing a digital number, $n$ digital to analog converters with each converter connected to a respective one memory unit of said $n$ memory units, means connected to each of said digital memory units, each responsive to a particular one of said command signals for periodically changing the number stored in the connected memory, means for changing the output of the digital to analog converter connected to the connected memory, and control means connected between each of said digital to analog converters and a corresponding one of said variable impedance elements for setting the impedance of said corresponding element at a value related to the number stored in the corresponding digital memory unit.

7. Apparatus as set forth in claim 6 wherein each of said variable impedance elements is a thermistor provided with a heater and wherein said digital to analog converter includes means for developing *n* analog currents each having a magnitude related to the number stored in a corresponding one of said *n* memory units, and where said control means comprises means for applying each of said analog currents to the heater of the corresponding one of said thermistors.

8. Apparatus as set forth in claim 6 including, in combination, a source of a test signal including components at said *n* different frequencies located at said remote point, means at said main station for generating a further command signal distinguishable from said *n* command signals, means for communicating said further command signal to said remote point, means at said remote point responsive to said further command signal for applying said test signal to said line, and means for measuring the relative magnitudes of the components of said test signal as received at said main station.

9. Apparatus as set forth in claim 8 including additional means at said main station for generating a still further command signal distinguishable from said *n* command signals, means responsive to said further command signal for applying said test signal source to the input of said equalizing network, and means responsive to said still further command signal for connecting said test signal source to the output of said equalizing network.

References Cited

UNITED STATES PATENTS

| | | | |
|---|---|---|---|
| 2,465,531 | 3/1949 | Green | 331—18 X |
| 2,520,007 | 8/1950 | Hochgraf | 179—175 |
| 3,041,555 | 6/1962 | Latimer et al. | 333—17 X |
| 3,046,499 | 7/1962 | Waldick | 333—28 |

HERMAN KARL SAALBACH, *Primary Examiner.*

M. NUSSBAUM, *Assistant Examiner.*